Figure 4:
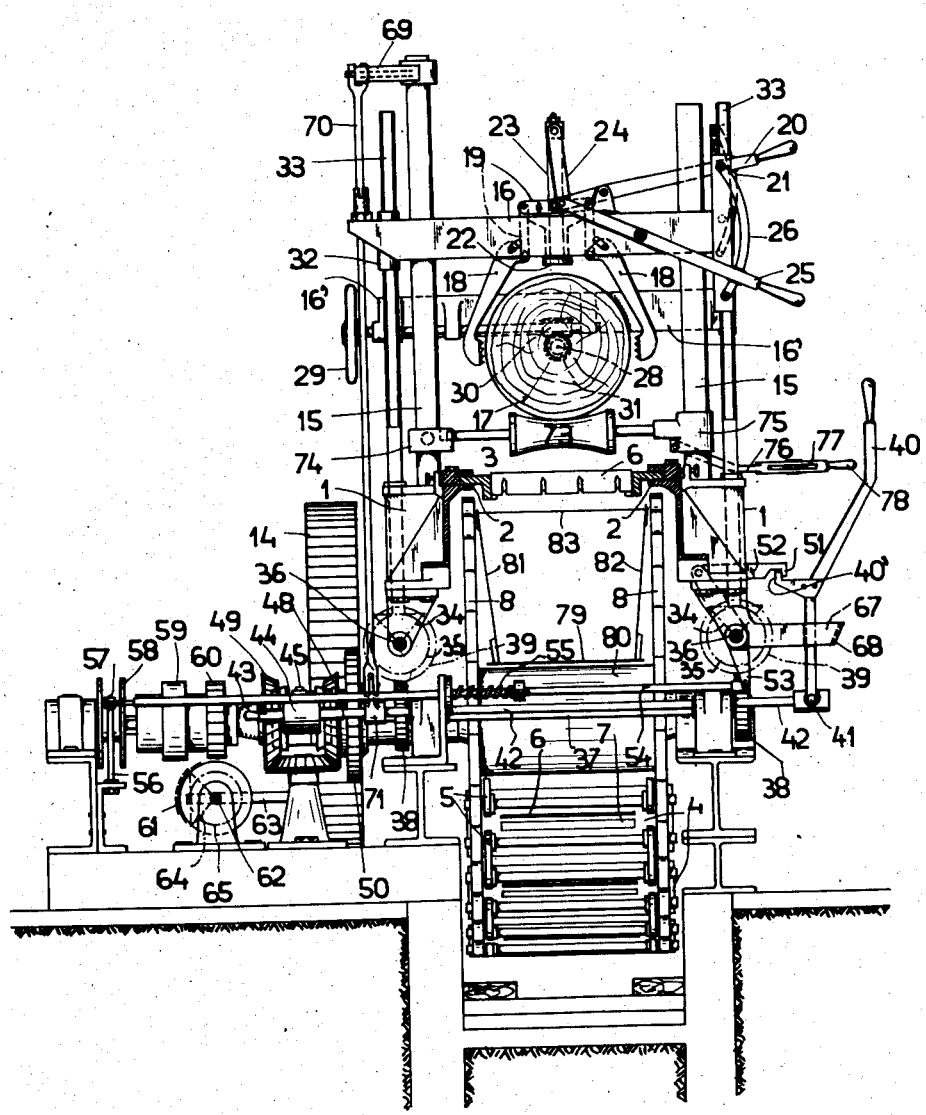

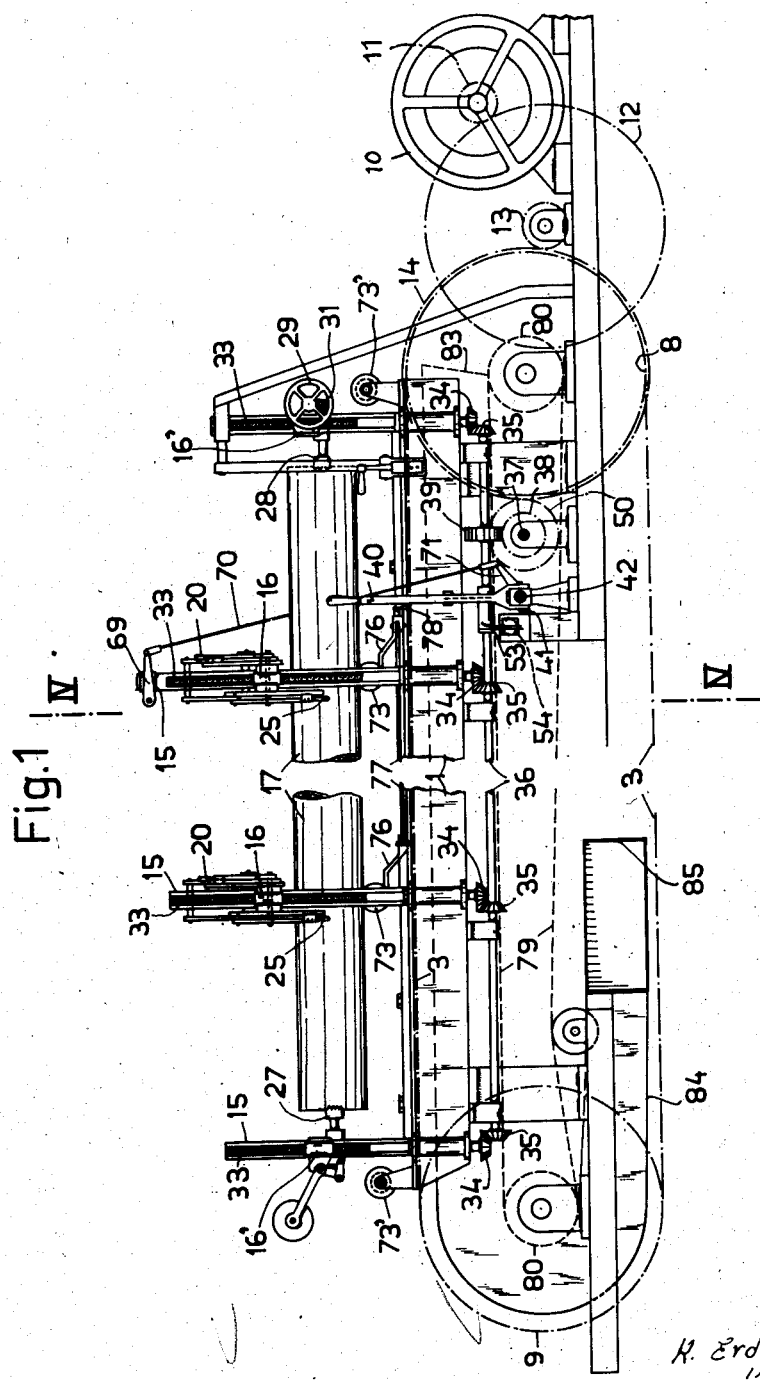

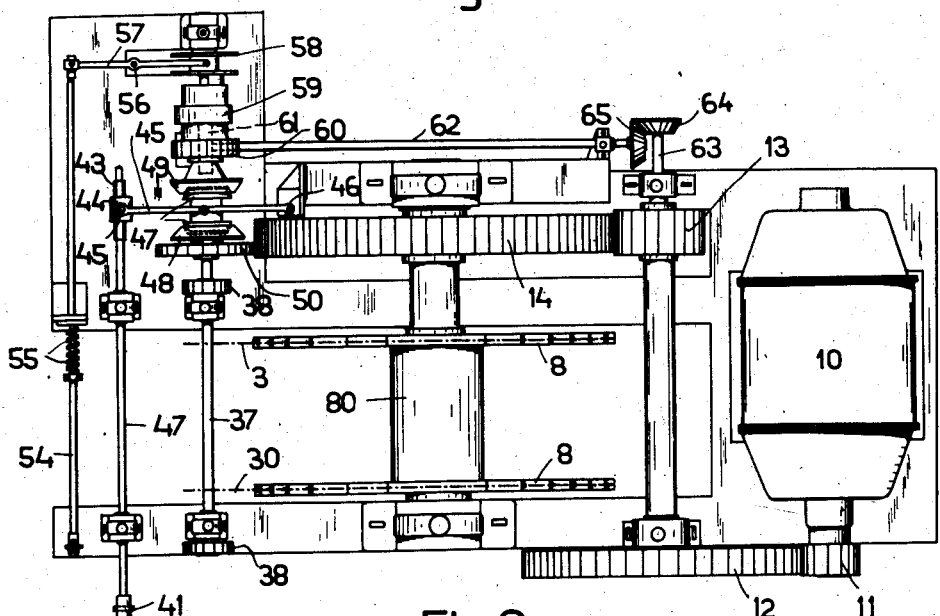
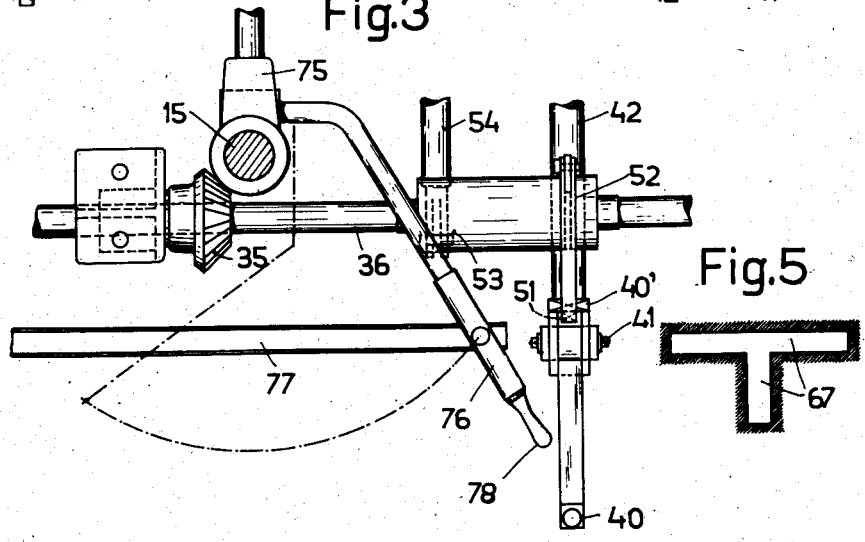
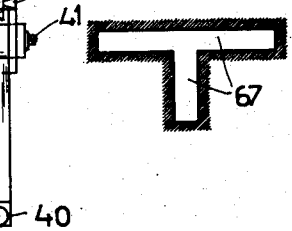

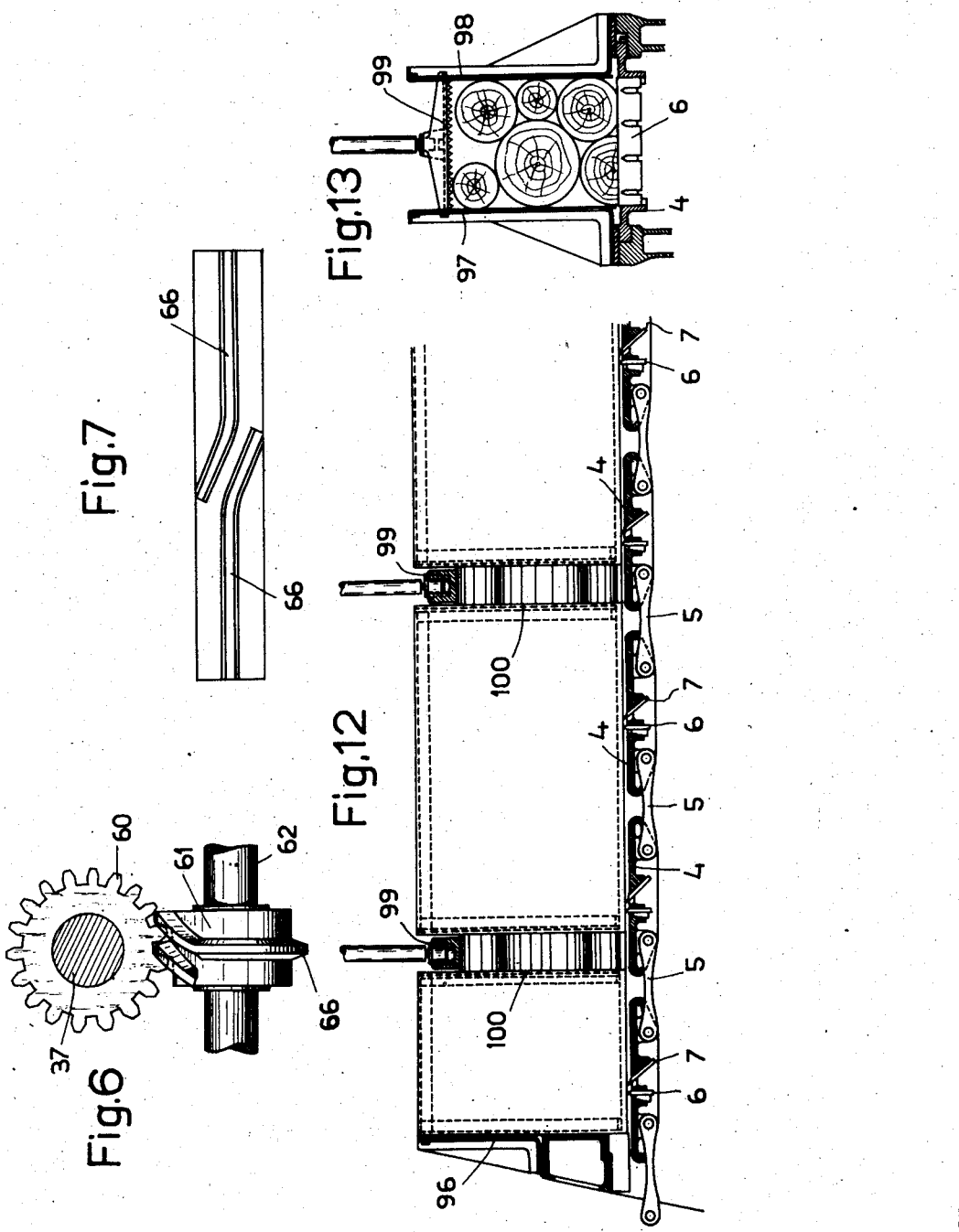

Patented Aug. 12, 1930

1,772,712

UNITED STATES PATENT OFFICE

KONRAD ERDMANN, OF RADENTHEIN, KARNTEN, AUSTRIA

METHOD AND MACHINE FOR MANUFACTURING WOOD WOOL

Application filed November 14, 1928, Serial No. 319,418, and in Austria December 6, 1927.

The invention relates to a method and machine for making wood wool or the like, and in general has for its object to render the manufacture of the said article more economical than it had hitherto been possible.

In the known types of shredding machines working with a reciprocating sledge or with a chain carrying the cutters the piece to be cut is only fed transversely to the movement of the cutters after the latter have finished working. During this feeding movement the cutters are inoperative. By this manner of proceeding and by the fact, that the produced strips have the length of the piece of wood to be cut the length of these pieces is limited and usually is chosen about 50 centimeters. The timber, usually supplied in considerably greater lengths and mostly having a length of about 4 meters, must therefore be cut into short pieces prior to being put on the machine.

According to the present invention timber blocks of any convenient length can be directly worked up into wood wool, the output being at the same time increased thereby.

This is accomplished by causing a plurality of sets of spurs (scoring knives) and cutters, arranged consecutively one behind the other and running in the same direction, to act simultaneously on the piece to be cut and feeding the latter transversely of the direction of movement of the cutters during their engagement with the timber, that is to say while the said sets of spurs and cutters are working. If the block of timber or other piece to be worked upon is fed intermittently at intervals, in the time between which the cutters have run a way a little longer than the distance between the single sets of spurs and cutters, strips will be obtained the length of which is approximately equal to this last mentioned distance. By this way of proceeding the output, when compared with that of known machines, is increased, as permanently a plurality of cutting elements is simultaneously working.

In so far as the machine for effecting the hereinbefore explained method is concerned, there is one object of the invention to provide means for facilitating the introduction of the material to be cut into the machine.

Another object is to provide means allowing the piece of timber to be clamped in the operative position within short time.

A further object is to provide two gears for moving the block of timber, one continuously acting for adjustment and the other intermittently acting for feeding.

A further object is an arrangement for controlling both gears by means of one single lever.

A further object is to provide suitable means for carrying away the produced wood wool.

Further features of the invention will be set forth with reference to the accompanying drawings showing, by way of example, one embodiment of a machine for carrying the invention into practice.

Fig. 1 is an elevation of the machine, the middle part thereof being broken away, Fig. 2 is a plan view of the two gears at an enlarged scale, Fig. 3 is a plan view of the lever for controlling the gears and of a locking device at an enlarged scale, Fig. 4 is a vertical transverse sectional view on line IV—IV of Fig. 1, at an enlarged scale, Fig. 5 shows a detail, Figs. 6 and 7 show a detail of the gear for intermittent feed at an enlarged scale, Figs. 8 to 11 show schematically the proceedings, by which the strips are cut off and Figs. 12 and 13 a machine without any mechanical feeding device, Fig. 12 being a partly sectional elevation and Fig. 13 a cross sectional view.

The frame work of the machine as shown by Figs. 1 to 7 is composed of section iron bars and coatings constituting two lateral beams or girders 1, 1 at both sides of the longitudinal axis of the machine. Guides 2, 2 are secured thereto for the working side (flight) of the chain 3 bearing the cutters, which chain is composed of a plurality of sledges 4 pivotally connected to one another by means of chain links 5 (Fig. 12). Each sledge bears a set of spurs (scoring knives)

6 and a cutter (plane-iron) 7. The cutter chain runs over the chain (sprocket) wheels 8, 9, the chain wheel 8 being driven from a motor 10 by means of the intermediate toothed wheels 11, 12, 13 and 14.

To the frame sides 1 vertical rods 15 are secured at equal distances, by which rods the cross-heads 16, 16' are guided so as to be capable of sliding up and down thereon. On these cross-heads the devices for supporting and clamping the block of timber 17 to be worked up are mounted. The clamping is effected by means of tongs (pinchers) 18 controlled by a leverage 19, the hand lever 20 of which can be anchored at a toothed sector (quadrant) 21. For taking up the vertical pressure exercised by the spurs and cutters abutment heads 22 are provided, which are fastened to vertical rods 23, the latter being slidably mounted in the cross-heads. These rods are by a lever 24 connected to a hand lever 25 which can be locked in the required position by means of the toothed sector 26. The two cross-heads 16' at the ends of the machine are, instead of tongs, provided with claws 27, 28 adapted to be driven into the end surfaces of the timber. The claw 27 is freely rotatable, the claw 28 can be turned by means of the hand wheel 29 and the intermediate gearing 30, 31.

At both ends of each cross-head nuts 32 are provided, engaging with vertical threaded spindles 33, which are rotatably mounted in bearings provided on the side beams 1 of the frame. All the threaded spindles have the same pitch and can only turn simultaneously at the same speed. To the lower end of each threaded spindle a bevel gear wheel 34 is fastened, engaging with a mitre wheel 35. The mitre wheels 35 of each side of the machine are mounted on a common shaft 36, the two shafts 36 being driven from a shaft 37 by means of the intermediate toothed wheels 38 and 39.

The shaft 37 can be turned in two different manners, continuously in either direction or intermittently in one direction only, a special gearing being provided for each of these modes of rotation and a common lever 40 adapted for alternately engaging either the one or the other of these gears. The lever 40 is by means of a transversal pinion 41 connected to the horizontal shaft 42, on the threaded part 43 of which a screw nut 44 is sliding. To the latter the one end of a lever 45 is pivotally connected, which can swing round a pivot 46 fixed on the frame of the machine and the middle part of which engages with a double clutch-cone 47 movable on the shaft 37. On the latter the mitre wheels 48 and 49 of a reversing gear are idly mounted, the wheel 48 being bodily connected to a spur gear wheel 50, which engages with the toothed wheel 14 driven by the motor. In its middle position as illustrated the double clutch-cone is coupled neither with the one nor the other of the two wheels 48, 49 of the reversing gear. If the lever 40 is round the axis of the shaft 42 turned in the one direction or the other, the nut 44 will be shifted, the lever 45 turned the one way or the other and consequently the double cone 47 coupled with the one or the other of the wheels 48, 49 of the reversing gear.

In accordance thereto the shaft 37 and all the threaded spindles 33 will turn in the one direction or the other, so that thereby the cross-heads 16, 16' are lifted up or lowered.

The lever 40 is provided with a thumb or catch 40' (Fig. 4) which, when the double cone 47 is in its middle position, engages with the hook 51 of a rod- and lever-system 52, 53, 54. The rod 54 is kept in position by a spring 55 and at its end pivotally connected to a lever 57, which can swing round the fixed pivot 56 and engages with a muff-coupling 58 movable on the shaft 37. If the lever 40 is turned from the position shown in Fig. 4 to the right, the muff-coupling 58 will be shifted so that it will be coupled with an element 59 idly mounted on the shaft 37. This element is bodily connected to a worm wheel 60 engaging with a worm 61 of specially designed form, which is secured to the shaft 62, the latter being driven from the jack shaft 63 by means of the intermediate bevel gear 64, 65. The shape of the worm is to be seen from Figs. 6 and 7, the latter showing a development of the tooth 66 of the worm. The thread is only for a certain relatively small part inclined, thus forming the pitch, whilst for the other part thereof there is no pitch. Owing to this form of the worm only part of a full revolution of the shaft 62 is transmitted to the worm wheel 60, the other part of the revolution of said shaft having no influence on the worm-wheel. Consequently, when the couplings 58, 59 are engaged, the shaft 37 will be turned so that equal periods of rotation will alternate with equal periods of rest. In accordance thereto the cross-heads will after equal periods of rest be moved by jerks towards the chain 3 bearing the cutters.

Although the couplings 47 and 58 causing either continuous or intermittent motion of the cross-heads, are to be actuated by the common lever 40, they can never be thrown in simultaneously. If the coupling 47 ought to be connected, the lever 40 has to be turned round the shaft 42 either to the left or to the right, by which movement the catch 40 is disengaged with the hook 51. For connecting the coupling 58 the lever 40 has to be turned round the pivot 41, which movement does not influence the coupling 47. If after the coupling 58 has been thrown in, one would try to connect also the coupling 47 by turning the lever 40 round the axis of the shaft 42, the catch 40' would disengage with the hook 50 and the rod 54 will by the spring 55 be pushed back into its initial position, at which the coupling 58 is disconnected.

Advantageously a guide is provided for the lever 40, which guide prevents the lever from being moved in any other direction than is required for actuating the said two clutches. Such guide may consist of a plate or arm 68 secured to the frame of the machine and provided with a T-shaped slot 67, as is at an enlarged scale shown by Fig. 5.

In order to prevent the cross-heads 16, 16′ being by inadvertence lifted up so far as to be disengaged with the ends of the threaded spindles 33 some safety device limiting the said movement is to be provided. It may, as shown, consist of a clutch-lever 69 pivotally connected to one of the guide rods 15 and by a system of levers 70, 71 connected to the shaft 42. When the respective cross-head 16 will have reached its highest admissible position, it will turn the lever 69, which itself by the levers 70, 71 will turn the shaft 42 to such extent, that the coupling element 47 will take up its middle position, by which the gear for continuous motion of the cross-heads is disconnected.

Above the cutter-chain 3 rollers 73 are provided, the bearings 74, 75 of which are mounted on the rods 15. The bearings 74 are laterally open, the bearings 75 closed and adapted for being turned round the axis of the rods 15. To each bearing 75 a lever 76 is secured and all the levers 76 are connected by a rod 77 extending parallel to the longitudinal axis of the machine. Consequently, if one of the levers 76 provided with a handle 78 is turned, simultaneously all the levers 76 will turn likewise and together with them also the rollers 73, the movement of the latter being limited so that they are lying parallel to the axis of the machine when having reached the one final position.

At both ends of the machine rollers 73′ are provided, the bearings of which are fixed to the frame of the machine and which therefore cannot be turned.

Below the cutter-chain an endless belt 79 is running over the drums 80, which are mounted on the same shaft as the chain wheels 8 and 9. 81 and 82 are longitudinally arranged fixed walls, which together with the cutter-chain and the belt 79 form a channel closed on one side by the cross-wall 83. On the other side a wall 84 is provided to catch the wood wool falling off from the belt. 85 is a transverse channel, in which underpressure is produced. The wood wool cut off from the timber falls, partly owing to its own weight and partly owing to the effect of aspiration, down on the conveying belt 79 and is by suction carried away through the channel 85.

Figure 9:
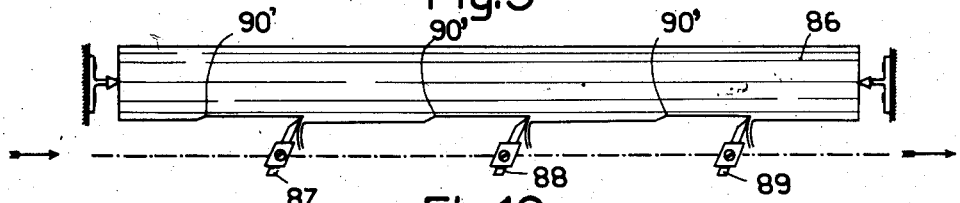
Figure 10:
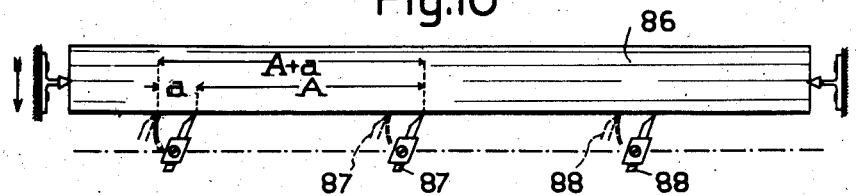
Figure 11:
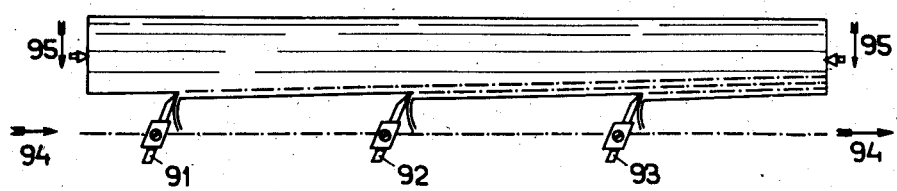

Prior to describing the operation of the machine the manner, in which the strips are separated from the block of wood at an intermittent feeding movement of the cross-heads may be set forth with reference to Figs. 8, 9 and 10, by which these proceedings are schematically illustrated.

In these figures 86 is the block of wood, 87, 88 and 89 are the cutters (knives working in the manner of plane-irons), which are pushed in the direction of the arrows at a constant speed.

Figure 8:

At the position according to Fig. 8 the feeding motion of the block, during which the cutters had penetrated into the block along the inclined line 90, is just accomplished. The cutters will now, while the block is at rest, move into the position according to Fig. 9, during which movement each cutter cuts off the strips from the block. When one of the cutters has attained the place where the preceding cutter had been at the moment, when the feeding motion had commenced, (which position is in Fig. 10 indicated by dotted lines), the new period of feeding motion is not yet to be started, but it has to set in only after each cutter has passed the edge 90′ and has reached the position shown in Fig. 10 by full lines. In this movement the block has a plane (flat) working surface. Consequently, if the distance of the cutters from each other is A, the feeding movement of the block must not set in until the cutters have travelled a way A+a, when a designates a distance equal or longer than the length of the wedged ends of the strips.

Prior to introducing a block or trunk the cross-heads 16, 16′ are lifted and the rollers 73 are by turning the levers 76 brought into their transverse position. Now the block is introduced so that it is supported by the rollers 73 and that its end surfaces are between the claws 27, 28. Then the lever 40 is turned round the axis of the shaft 42 so far, that the claws are facing the axis of the block, that is to say the middle of its end surfaces. The tongs 18 are now closed by means of the lever 20 and the heads 22 pressed against the block by actuating the hand-lever 25. Finally the claws 27, 28 are driven into the end surfaces of the trunk, which, thus clamped, is lifted up so far, that the rollers 73 freed thereby can be turned into their position parallel to the longitudinal axis of the machine.

By turning the hand lever 40 round the axis of the shaft 42 to the right (when referring to Fig. 3), the trunk is lowered until it will be suspended directly above the cutter and then the lever is turned back into its middle position, whereby the gear for adjustment is disconnected. By turning the lever round the pivot 41 to the right (when referring to Fig. 3) the gear for intermittent feed is now thrown in and thereby the cutting operation started. The chippings fall on the conveying belt 79 and by its motion as well as by the air draft are carried into the transverse channel 85. If a certain required part of the material has been worked off from the block, the lever 40 is moved into its initial position and thereby the gear for intermittent feed is thrown out of engagement. By connecting for a short time the gear performing the continuous vertical movement the block is now lifted a little and the clamping elements 18 and 22 are loosened, so that the trunk is maintained in its position by the claws 27, 28 only. The block is now turned by means of the hand wheel 29 of the claw 28 round its axis so that a fresh side or part thereof is facing the cutter-chain. After having the block fixed by means of the clamping elements 18, 22 the cutting operation can be started again.

If the trunk each time a certain part thereof had been cut away, is turned for 90 degrees, there will finally remain a block of square or rectangular section. When only two opposite sides are worked off, the remaining piece will be a board, the thickness of which is a little greater than the diameter of the claws 27, 28. But the trunk may also be operated on from several sides so as to obtain for instance a rod of polygonal section.

The invention is not limited to the use of the intermittent feed during the cutting operation, on the contrary the trunk may also be fed continuously, in which case the produced strips will have the length of the trunk. From Fig. 11 there is to be seen, how in such case the cutters are working. Three cutters 91, 92, 93 are shown, the cutting lines of which are indicated by dot and dash lines. The sectional view of the surface thus cut somewhat resembles the teeth of a saw. The surfaces between the single cutters are inclined, their inclination resulting from two movements taking place simultaneously, viz the running of the cutters in the direction of the arrows 94 and the feeding movement of the block in the direction of the arrow 95.

If a machine as shown by Figs. 1 to 8 is run at continuous feed, the surface of the block would be uneven if the machine is stopped all at once. This inconvenience can be avoided, if the cutters are allowed to run on after the feeding device has been stopped, so that the remainder of strips will be cut off and the surface of the block rendered even.

By continuous feed there is also the possibility offered of working the wood completely up into wood wool, if the feed is effected by allowing the block rest on the cutting chain, as is shown by Figs. 12 and 13. In these figures only the cutter chain and the arrangement for placing the trunks are shown. Construction and operation of the main is the same as has been described for the first example of embodiment of the invention.

Above the cutter chain a box is provided with front walls 96 and side walls 97, 98, which box is open at the top and in which the trunks are placed so as to be superposed. 99 are plungers guided in slots 100 of the side walls and serving as loads of the trunks. The continuous feeding movement is effected by the weight of the trunks and that of the plungers resting thereon. The longitudinal stress exercised by the cutters is taken up by the front wall 96 and also by the friction on the adjacent trunks. If part of the trunks has been worked up, the plungers are removed and the box filled again with fresh trunks.

What I claim is:

1. A method for manufacturing wood wool which consists in causing a plurality of sets of spurs and cutters, consecutively arranged behind each other and running in the same direction, to act simultaneously on the work piece and intermittently moving the latter in the feeding direction during the operation of the cutters.

2. A method for manufacturing wood wool which consists in causing a plurality of sets of spurs and cutters, consecutively arranged behind each other at equal distances and running in the same direction, to act simultaneously on the work piece and moving the latter in the feeding direction after equal periods of time, during which the cutters have travelled a way longer than their distance.

3. A shredding machine for manufacturing wood wool comprising an endless chain, sets of spurs and cutters mounted on some links of the chain at distances smaller than the length of the piece of work, guides for the working flight of the chain, feeding abutments for the work piece and a gear for intermittently moving the abutments.

4. A shredding machine for manufacturing wood wool comprising an endless chain, sets of spurs and cutters mounted on some of the links of the chain, guides for the working flight of the chain, feeding abutments and clamping devices for the work piece, which are mounted on cross-heads, and a gear for intermittently shifting the cross-heads.

5. A shredding machine for manufacturing wood wool comprising an endless chain, sets of spurs and cutters mounted on some of the links of the chain, guides for the working flight of the chain, abutments and clamping devices for the work piece, which are mounted on cross-heads, a gear for continuously moving the cross-heads and the work piece into the operative position prior to the beginning or the cutting and a gear for intermittently moving them to feed during the cutting operation.

6. A shredding machine for manufacturing wood wool comprising an endless chain, sets of spurs and cutters mounted on some of the links of the chain, guides for the working flight of the chain, abutments and clamping devices for the middle part of the work piece, claws adapted to be driven into the end surfaces of the work piece, which abutments and claws are mounted on cross-heads, gears for shifting the cross-heads and a gear for rotating one of the claws.

7. A shredding machine for manufacturing wood wool comprisng an endless chain, sets of spurs and cutters mounted on some of the links of the chain, guides for the working flight of the chain, abutments and clamping devices for the work piece, which are mounted on cross-heads, a gear for continuously moving the cross-heads, a gear for intermittently moving them, couplings for connecting and disengaging these gears and a controlling lever common to both these couplings.

8. A shredding machine for manufacturing wood wool comprising an endless chain, sets of spurs and cutters mounted on some of the links of the chain, guides for the working flight of the chain, abutments and clamping devices for the work piece, which are mounted on cross-heads, a gear for continuously moving the cross-heads, a gear for intermittently moving them, couplings for connecting and disengaging these gears and a controlling lever common to both these couplings, which lever is adapted to be turned round a transverse pivot on the rod system of the one coupling and in the middle position of this coupling engages with a catch provided on the rod-system of the other coupling.

9. A shredding machine for manufacturing wood wool comprising an endless chain, sets of spurs and cutters mounted on some of the links of the chain, guides for the working flight of the chain, abutments and clamping devices for the work piece, which are mounted on cross-heads, a gear for continuously moving the cross-heads, a gear for intermittently moving them, couplings for connecting and disengaging these gears, a controlling lever common to both these couplings and a second lever for disconnecting the gear for continuous movement of the cross-heads, which second lever is placed in the path of one of the cross-heads.

10. A shredding machine for manufacturing wood wool, comprising an endless chain, sets of spurs and cutters mounted on some of the links of the chain, guides for the working flight of the chain, abutments and clamping devices for the piece of work, which are mounted on cross-heads, gears for moving the cross-heads, and transversal rollers arranged above the cutter chain, which are adapted for being moved out of the path of the piece of work.

11. A shredding machine for manufacturing wood wool, comprising an endless chain, sets of spurs and cutters mounted on some of the links of the chain, guides for the working flight of the chain, abutments and clamping devices for the piece of work, which are mounted on cross-heads, gears for moving the cross-heads, and transversal rollers arranged above the cutter chain, which are rotatably mounted on the one hand in rotatable bearings and on the other in open bearings.

12. A shredding machine for manufacturing wood wool, comprising an endless chain, sets of spurs and cutters mounted on some of the links of the chain, guides for the working flight of the chain, abutments and clamping devices for the piece of work, which are mounted on cross-heads, gears for moving the cross-heads, and transversal rollers arranged above the cutter chain, which are adapted for being turned out of the path of the piece of work and the controlling levers of which are pivotally connected by a rod.

13. A shredding machine for manufacturing wood wool comprising an endless chain, guides for the working flight of the chain, sets of spurs and cutters on some of the links of the chain at distances which are smaller than the length of the piece of work, and an endless conveying belt running between the two flights of the endless chain and constituting the running bottom of a channel formed sidewise by longitudinal walls and at the top by the working flight of the chain.

In testimony whereof I have signed my name to this specification.

KONRAD ERDMANN.